United States Patent Office 3,502,896
Patented Mar. 24, 1970

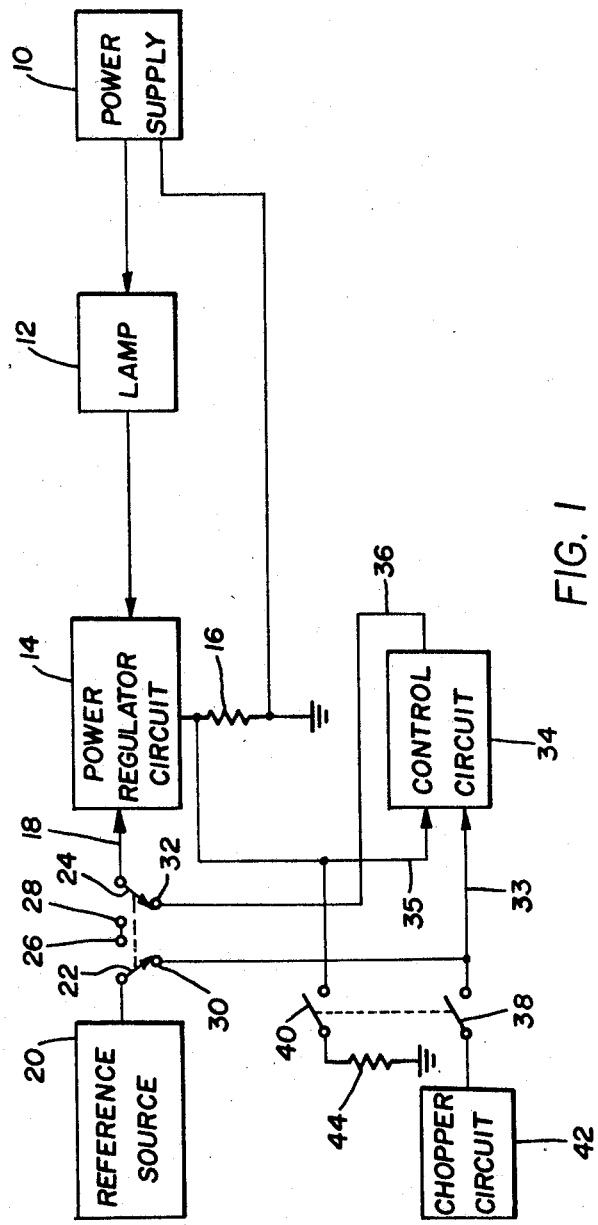

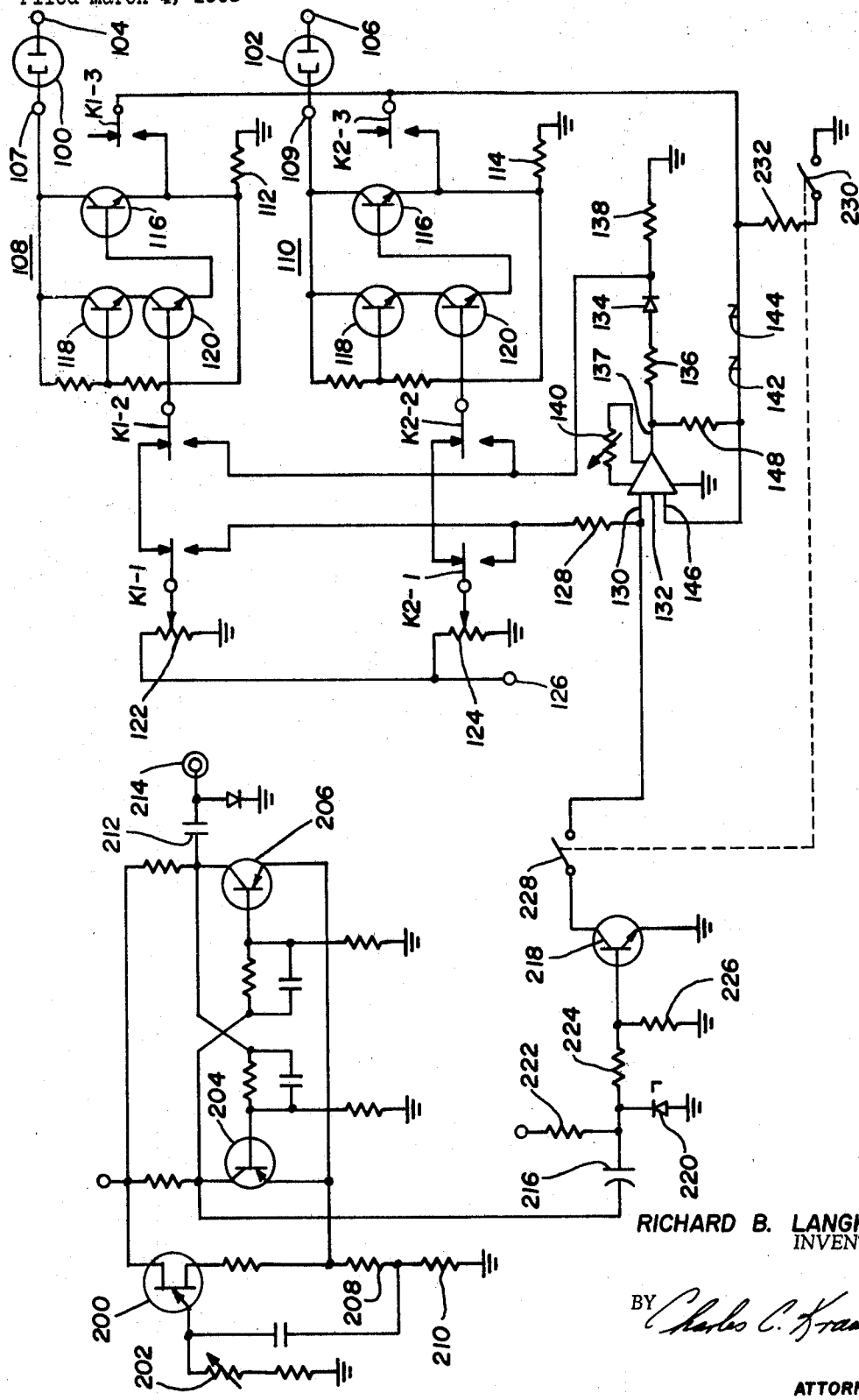

3,502,896
POWER SUPPLY CIRCUIT
Richard B. Langkamp, Webster, N.Y., assignor to Bausch & Lomb Incorporated, Rochester, N.Y., a corporation of New York
Filed Mar. 4, 1968, Ser. No. 710,286
Int. Cl. G05f 3/00
U.S. Cl. 307—31
9 Claims

ABSTRACT OF THE DISCLOSURE

A power supply provides means for applying standby power to a plurality of loads, such as lamps, and allows one of the loads to be highly regulated and/or modulated. A separate series regulator circuit is provided for each load. In "standby" operation, the regulator is controlled by applying a biasing potential directly to the regulator. In "continuous" operation, the regulator circuit is connected as a portion of a high gain feedback circuit to highly regulate the current flow through a load. In "modulated" operation, a periodically varying signal is introduced into the feedback circuit to accurately modulate the conduction of the regulator circuit.

Background of the invention

In atomic absorption spectrophotometers, such as disclosed in the copending application Ser. No. 617,103, filed for James J. Chisholm and Henry J. Emmel, a separate hollow cathode lamp is provided for each element to be tested. Before such hollow cathode lamps can be used to make measurements, their operation must be stabilized. This is particularly true if the atomic absorption unit employs a single beam spectrophotometer. It takes a considerable amount of time to stabilize the operation of the hollow cathode tube so that the tubes must be generally energized into "standby" at the same current level as in the "operate" mode so that they can be readily switched into operation with minimum drift.

When such tubes are switched into operation, the current flow through the lamp must be highly regulated to provide a stable source either with constant or modulated current. Furthermore, it is highly desirable to be able to operate the lamps at their optimum capacity to provide a higher signal to noise ratio but still have sufficient tube operating life.

Summary of the invention

The power supply of the invention provides for energizing a plurality of loads, such as hollow cathode tubes, at some predetermined operating capacity and for simultaneously accurately regulating the current flow through one load, or accurately modulating the current through one load. A separate series regulator circuit is connected in series with each load and a direct current source. A reference source is provided for each regulator for controlling the amount of current flowing through each load. Circuit means are provided for measuring the current flow through each load to provide a feedback signal. When the loads are in standby condition, a switching circuit connects the reference sources directly to the regulator circuits.

When a load is in the operating condition, the corresponding reference source is switched to a control circuit that provides an output signal that is a function of at least two input signals applied thereto. The other input signal is the feedback signal from the operating load. The output of the control circuit is switched to the corresponding regulator circuit so that the connected regulator becomes a portion of a well regulated feedback control circuit.

When the load is to be modulated, a periodic switching circuit is connected to one of the inputs of the control circuit in addition to the regular inputs. This causes the output signal applied to the connected regulator to vary at the rate of the periodic switching circuit and accordingly, it modulates the current flowing through the selected load.

A further feature of the invention includes a technique for obtaining "100% modulation" at the same average current level as the continuous operation. Current through the load is sensed by a series resistor which develops the feedback signal. During modulation, a like value of resistor is shunted across the sensing resistor of the circuit to be modulated so that the feedback control system corrects the current level in the load to two times the original level (since the reference source has remained unchanged). Then, the square wave signal is applied to the feedback amplifier so that it cuts off the current through the load 50% of the time. This then gives a load current of two times the "reference" level, modulated 100%. Thus the average modulated current is identical to the average operating current unmodulated. This contributes to the ease of operation as well as optimum stability of the light output when changing modes of operation.

Brief description of the drawings

FIGURE 1 is a simplified block diagram of a power supply circuit including the invention.

FIGURE 2 is an electrical schematic diagram of the block diagram of FIGURE 1 including more than one load.

Description of the preferred embodiment

In the block diagram of FIGURE 1, a direct current potential is supplied by a conventional power supply circuit 10. A load or lamp 12 is connected in a series circuit with the power supply 10, a series power regulator circuit 14 and a resistor 16. The power regulator circuit 14 includes an input circuit 18 for receiving a signal or bias voltage for controlling the amount of current flow through the lamp 12. The resistor 16 generates a feedback signal proportional to the current flow through the series circuit including the load 12.

A reference source 20 provides a direct current potential for setting the conduction through the regulator circuit 14. When the ganged switches 22 and 24 make conection with contacts 26 and 28 the reference potential is applied directly to the regulator circuit 14. When the switches 22 and 24 make connection with contacts 30 and 32 (as illustrated) the reference potential is applied to an input circuit 33 of a control circuit 34 and an output circuit 36 of the control circuit is connected to the input circuit 18 of the regulator circuit 14. The feedback signal from the resistor 16 is applied to the other input circuit 35 of the control circuit 34. The control circuit 34 can for example be a high gain differential amplifier that provides an output signal proportional to the difference between the two input signals.

When the lamp 12 is to be operated in a standby condition, the switches 22 and 24 make connection with contacts 26 and 28 and the current flow through the lamp 12 is regulated by an open-loop system. When the switches 22 and 24 make connections with the contacts 30 and 32, the lamp 12 is in the "operate" condition wherein the current flow through the lamp 12 is regulated by a high gain feedback control circuit.

If the current through the lamp 12 is to be modulated, the ganged switches 38 and 40 are closed. The switch 38 connects a chopper circuit or periodic switching circuit 42 to the input circuit 35. The chopper circuit 42 alternately and periodically presents open and short circuits.

When the chopper circuit 42 presents a short circuit the input circuit 35 is grounded causing the control circuit 34 to cut off the current flow through the series circuit including the lamp 12 (zero volts developed across resistor 16). When the chopper circuit 42 presents an open circuit the regulator circuit 14 is rendered conductive to provide a current flow through the lamp 12 determined by the amplitude of the feedback signal with respect to the signal from the reference source 20. The switch 40 connects a resistor 44 in shunt with the feedback resistor 16. The resistor 44 is equal in value to the resistor 16 therefore the amount of current flow through the lamp 12 must be twice the original level provided the signal from the reference source 20 remains unchanged.

Accordingly, it can be seen that the modulation current through the lamp 12 will vary from zero to a peak value twice that of the current in the operate condition (switches 38 and 40 opened). If the switching period of the chopper circuit 42 is equal, the average modulation current through lamp 12 is equal to that in the continuous current operate condtion.

The circuit diagram of FIGURE 2 illustrates the power supply of the invention for simultaneously energizing a plurality of hollow cathode tubes. For purposes of simplicity, only two hollow cathode tubes 100 and 102 are illustrated but it must be understood that any number of such tubes can be energized. The terminals 104 and 106 of the tubes are adapted to be connected to a positive terminal with a direct current power supply. The other terminals 107 and 109 of the tubes 101 and 102, respectively, are connected to form a series circuit with the series regulator circuits 108 and 110 and the feedback resistors 112 and 114, respectively.

Each regulator circuit includes a power transistor 116 connected in series with the lamp and is controlled by a pair of cascade connected control transistors 118 and 120. The amount of current flowing through the series regulators is determined by the direct current potential applied to the base of the control transistor 120. The transistor 118 is connected in series with the transistor 120 sharing approximately one-half of the available collector voltage, to provide protection against high voltage breakdown and also to function as a current source for the transistor 120 to provide higher gain.

The intensity of the lamps or the amount of current flow through the lamps 100 and 102 is determined by the setting of potentiometers 122 and 124, respectively. The potentiometers 122 and 124 are connected between a power supply terminal 126 and ground. The movable arm of the potentiometer 122 is connected through two sets of normally closed contacts K1–1 and K1–2 of a relay K1 to the base electrode of the transistor 120 of the regulator circuit 108. The movable arm of the potentiometer 124 is connected through the normally closed contacts K2–1 and K2–2 of a relay K2 to the base electrode of the transistor 120 of the series regulator 110. When the relays K1 and K2 are deenergized the current flow through the lamps 100 and 102 is open-loop controlled by the settings of the potentiometers 122 and 124. This is considered the standby condition for operating the lamps 100 and 102.

The normally open contacts K1–1 and K2–1 are connected in common through a resistor 128 to an input circuit 130 of a differential amplifier 132. The normally open contacts K1–2 and K2–2 are connected through a protection diode 134 and a resistor 136 to the output circuit 137 of the differential amplifier 132. An adjustable potentiometer 140 is provided to balance the gain of the differential amplifier 132. The feedback resistors 112 and 114 are connected through the normally open contacts K1–3 of relay K1 and K2–3 of relay K2, respectively, through a pair of series stabistors 142 and 144 to the other input circuit 146 of the differential amplifier 132. A resistor 148 is connected between the output circuit 137 and the input circuit 148 to provide a biasing voltage for the stabistors 142 and 144 so that the stabistors 142 and 144 compensate for the base to emitter series voltage drops of the transistors 120 and 116.

When one of the lamps 100 or 102 is to be operated to provide a highly regulated constant intensity output, the relay K1 or K2 is energized. Assuming the relay K2 is energized, the voltage from the potentiometer 124 is removed from the regulator circuit 110 and is applied through the contact K2–1 to the input circuit 130. Simultaneously, the voltage across the resistor 138 is applied through the contacts K2–2 to the transistor 120 of the regulator 110. The feedback voltage (corresponding to the current flow through the lamp 102) is coupled through the contacts K2–3, and the stabistors 142 and 144, to the second input circuit 146. The differential amplifier 132 compares the feedback signal with the reference signal to maintain the current flow through the lamp 102 constant. In effect, the differential amplifier 132 and the regulator 110 function as a high gain feedback control circuit to highly regulate the amount of current flow through the lamp 102. The current flow through the lamp 100 will be regulated in the same manner by deenergizing the relay K2 and actuating the relay K1.

As can be seen, any number of lamps can be connected through separate regulator circuits, switching circuits, and controlled by separate reference or biasing potentiometers to be simultaneously energized in a standby or warmup condition. Since only one lamp is being used at a time, the other lamps can be held in the standby condition by a simple open-loop regulator circuit while the regulator circuit of the operated lamp can be connected as a portion of a high gain feedback system for accurately controlling the current flow through the lamp. With the system illustrated, only one feedback system is necessary which can be selectively connected to any of the regulator circuits, thereby minimizing the cost of such a power supply.

The chopper or modulator circuit of FIGURE 2 provides a symmetrical square wave for modulating the current flow through the lamps. A timing pulse generator for the system includes a unijunction transistor 200 connected as a relaxation oscillator, the frequency of oscillation being dependent upon the time constant of the input circuit and is adjusted by a potentiometer 202. This type of circuit is well known and needs no further explanation. A bistable multi-vibrator circuit, including the transistors 204 and 206, is connected to receive the oscillator pulses generated across the resistors 208 and 210. The bistable multi-vibrator circuit provides a substantially symmetrical square wave signal or cycle for each two pulses received from the relaxation oscillator. The symmetrical signal includes substantially equal time durations for minimum and maximum signal amplitudes. The square wave signal generated at the collector electrode of the transistor 206 is coupled through a capacitor 212 to an output terminal 214 to provide "sync" pulses for any demodulating systems to be used with the lamps. The square wave generated at the collector electrode of the transistor 204 is coupled through a capacitor 216 to a base electrode of a transistor 218 connected as a switching circuit. The Zener diode 220 limits the amplitude of the signal applied to the transistor to a safe level. The resistors 222, 224 and 226 provide biasing circuit for the transistor 218.

The collector electrode of the transistor 218 is connected through a switch 228 to the input circuit 130 of the differential amplifier 132. The switch 228 is also ganged for common operation with a switch 230 which connects the resistor 232 to ground. The square wave signals applied to the transistor 218 alternately cut off and saturate the transistor so that the signal on the input circuit 130 varies between the value set by the potentiometers 122 and 124 when the corresponding relay is energized and approximately zero volts. When the input circuit 130 is at zero signal level, the feedback control circuit functions to cut off the connected regulator circuit and interrupts a current flow through the associated lamp. When the transistor 218 is open-circuited the potentiometer and the feedback control circuit functions to drive sufficient current through the lamp to equalize the voltages at the input circuits 130 and 146. It should be noted that the resistor 232 is connected in shunt with either of the series resistors 112 and 114 (depending upon the relay energized) so that the amount of current that must flow through the connected lamp to provide a signal on the input circuit 146 to balance that on input circuit 130 is dependent upon the total resistance of the two shunt resistors. By making the resistor 232 equal in value to the resistors 112 and 114 the current flow through the connected lamp will vary from approximately zero to twice the current flow through the lamp when unmodulated (switches 228 and 238 are open) providing 100% modulation. The signal on the input circuit 130 can be at a lower level (transistor 218 is saturated) than the input circuit 146 due to the action of the stabistors 142 and 144 allowing the regulator circuit to be completely cut off.

It should be noted that the lamps energized by the power supply of the invention can be maintained in a standby condition having a current flow that is substantially equal to the recommended operational current flow. This provides for a minimum of time delay between the operation of the various lamps. Furthermore, the current through the operated lamp when modulated has an average value equal to that of the recommended operating current. This provides for peak values twice that of the recommended continuous current flow, providing an improved signal-to-noise ratio without exceeding the specified optimum operating conditions of the lamp.

What is claimed is:

1. A power supply circuit comprising:
 a direct current power supply;
 a load;
 a series regulator circuit responsive to a control signal to regulate the current flow therethrough;
 first circuit means connecting said power supply, said load and said regulator circuit in a series circuit;
 a control circuit for developing a control signal that is a function of a plurality of input signals applied thereto;
 a source of direct current reference potentials;
 a second circuit means for developing a feedback signal corresponding to an amount of current flowing through said series circuit and coupled to apply said feedback signal to said control circuit;
 third circuit means for generating periodic signals;
 first switching means having a first state for connecting said source to said series regulator circuit for controlling the current flow through said series circuit as a function of said reference potential, and a second state for connecting said source to said control circuit and said control circuit to said series regulator circuit so that the control circuit functions as a feedback circuit for accurately controlling the current flow through said series path as a function of said reference potential, and
 second switching means for selectively connecting said third circuit means to said series regulator circuit so that said control circuit modulates the current flow through said series circuit at the frequency of said periodic signals when said first switch is in said second state.

2. A power supply circuit as defined in claim 1 wherein:
 said second circuit means includes first resistor means connected in said series circuit for generating said feedback signal;
 said switching means connects second resistive means in shunt with said first resistive means when connecting said third circuit means to said series regulator, and
 said third circuit means generates periodic switching signals that modulate the current flow through said series circuit to vary between a peak amplitude approximately twice the current flow when said first switching means is in said first state and zero.

3. A power supply circuit as defined in claim 2 wherein:
 said third circuit means generates periodic square waves having equal time duration and includes a third switching circuit for periodically removing the reference potential applied to said control circuit so that the average current through said series circuit during modulation is equal to the current flow through the series circuit when unmodulated.

4. A power supply circuit as defined in claim 3 wherein:
 said control circuit includes a differential circuit that compares the reference potential with the feedback signal when the first switching means is in said second state and compares said reference potential to the feedback signal as controlled by said third switching circuit when said second switching means connects said third means to said control circuit.

5. A power supply circuit comprising:
 a direct current power supply;
 a plurality of loads;
 a plurality of current regulator circuits, a regulator circuit for each load, said regulator circuit being responsive to control signals for regulating current flow therethrough;
 first circuit means connecting separate ones of said regulator circuits to separate loads and said power supply for controlling the direct current flow through the connected loads;
 a plurality of second circuit means, individual ones connected to monitor the current flow through separate loads for developing feedback signals corresponding to the amount of current flowing through the connected load;
 a plurality of third circuit means, an individual one for each of said plurality of regulator circuits, for providing a plurality of reference potentials;
 differential control circuit means for developing a control signal that is a function of the difference between signals applied thereto:
 a plurality of first switching circuits, one for each regulator circuit, each having a first state for connecting individual ones of said third circuit means with separate ones of said regulator circuits for applying reference potentials thereto and having a second state for connecting individual ones of said third circuit means to said control circuit for applying reference potentials there and for connecting the control circuit to the corresponding one of said regulator circuits for applying a control signal there, and
 a plurality of second switching circuits, one for each regulator circuit, coupled to switch simultaneously with corresponding ones of said first switching circuits, for connecting individual ones of the second circuit means corresponding to the load connected to the associated regulator circuit to said control circuit for applying said feedback signal thereto when said coupled first switching circuit is in said second state.

6. A power supply circuit as defined in claim 5 including:
 fourth circuit means for generating a periodic signal, and
 third switching means for connecting said fourth circuit means to said control circuit for applying said periodic signal so that the current through the load connected to the regulator circuit having its corresponding first switching means in said second state is amplitude modulated at the rate of said periodic signal.

7. A power supply circuit as defined in claim 6 wherein:
said fourth circuit means includes a square wave generator for generating symmetrical square wave pulses and a switching circuit switched on and off by said square wave pulses;
said plurality of second circuit means comprise resistive means connected in series with said load;
second resistive means having values equal to said series resistive means, and
switching means for connecting said second resistive means to said control circuit so that the modulated current through a load varies between a peak amplitude approximately twice the current flow when said corresponding first switching circuit is in said first state and zero.

8. A power supply circuit comprising:
a source of direct current potential;
a plurality of loads;
a plurality of series regulator circuits, one for each load responsive to an input signal for controlling the current flow therethrough;
a plurality of resistors, one for each load;
circuit means connecting individual one of said loads in a series circuit between said source and separate ones of said regulator circuit and resistors;
biasing circuit means for providing a plurality of direct current reference potentials, one for each regulator circuit;
a differential control circuit for providing a control signal corresponding to the difference between at least two input signals;
a plurality of first switching circuits, one for each of said regulator circuits;
circuit means connecting individual ones of said first switching circuits between separate ones of said biasing circuit means, separate ones of said regulator circuits and said differential control circuit so that when a first switching circuit is in a first state the reference potential is applied to the corresponding regulator circuit and when a first switching circuit is in a second state the reference potential is applied to the differential control circuit and the control signal from the differential control circuit is applied to a corresponding regulator circuit;
a plurality of second switching circuits, one for each regulator circuit, coupled to corresponding ones of said first switching circuit to be actuated to pass signals when the corresponding one of said first switching is in its second state;
circuit means coupling individual ones of said second switching circuits between said separate ones of said plurality of resistors connected to corresponding regulator circuits for applying said feedback signals to said differential control circuit when actuated;
a third switching circuit being rendered conductive and nonconductive at a periodic rate and,
a fourth switching circuit for selectively connecting said third switching circuit to said differential control circuit means so that the control signal developed by said differential control signal is varied at said periodic rate.

9. A power supply circuit as defined in claim 8 including:
a second resistor having a value equal to individual ones of said plurality of resistor, and
a fifth switching circuit actuated simultaneously with said fourth switching circuit for connecting said second resistor to said differential control circuit so that said second resistor is connected in shunt with one of said plurality of resistors when the corresponding first switching means is in the second state and the corresponding fourth switching circuit is actuated.

References Cited

UNITED STATES PATENTS

| | | | |
|---|---|---|---|
| 3,378,758 | 4/1968 | Goodenow | 328—18 |
| 3,383,584 | 5/1968 | Atherton. | |
| 3,403,321 | 9/1968 | Mosak. | |

ROBERT S. MACON, Primary Examiner

H. J. HOHAUSER, Assistant Examiner

U.S. Cl. X.R.

323—22, 18